US009589218B2

(12) United States Patent
Ciavatta (10) Patent No.: US 9,589,218 B2
(45) Date of Patent: Mar. 7, 2017

(54) METHOD AND APPARATUS FOR THE REMOTE SUPPLY, DISPLAY AND/OR PRESENTATION OF DYNAMIC INFORMATIVE CONTENTS

(71) Applicant: QUZZUP SRL, Dogana (SM)

(72) Inventor: Aldo Ciavatta, Dogana (SM)

(73) Assignee: QUZZUP SRL, Dogana (SM)

( * ) Notice: Subject to any disclaimer, the term of this patent is extended or adjusted under 35 U.S.C. 154(b) by 0 days.

(21) Appl. No.: 14/917,253

(22) PCT Filed: Aug. 26, 2014

(86) PCT No.: PCT/IB2014/064073
§ 371 (c)(1),
(2) Date: Mar. 7, 2016

(87) PCT Pub. No.: WO2015/033248
PCT Pub. Date: Mar. 12, 2015

(65) Prior Publication Data
US 2016/0196484 A1 Jul. 7, 2016

(30) Foreign Application Priority Data
Sep. 5, 2013 (IT) .............................. MI2013A1455

(51) Int. Cl.
*G06K 7/10* (2006.01)
*G06K 9/36* (2006.01)
(Continued)

(52) U.S. Cl.
CPC . *G06K 19/06037* (2013.01); *G06F 17/30879* (2013.01); *G06F 17/30887* (2013.01); *G06K 7/1417* (2013.01)

(58) Field of Classification Search
CPC .. G06K 7/10; G06K 9/36; G06K 9/80; G06K 9/18; G06K 7/14; G06K 19/00; G08C 21/00; G06F 17/00
(Continued)

(56) References Cited

U.S. PATENT DOCUMENTS

| 2007/0124414 | A1 | 5/2007 | Bedingfield et al. |
| 2011/0283196 | A1 | 11/2011 | Berger et al. |
| 2013/0026241 | A1* | 1/2013 | Sakahashi ........ G06K 19/06037 235/494 |

OTHER PUBLICATIONS

Shannon, Scott, "Using QR Codes and Google Analytics to Track Mobile Devices," pp. 1-3, Mar. 7, 2011.
(Continued)

*Primary Examiner* — Edwyn Labaze
(74) *Attorney, Agent, or Firm* — Marshall, Gerstein & Borun LLP (57) ABSTRACT

Method for the remote supply, display and/or presentation of dynamic informative contents by generating a QR code with a dynamic content, which provides to define a quantity n of a series of QR codes to be generated, to generate x URL addresses on the Internet, until x=n, to verify the univocity of each of the x URL addresses generated, by comparing them with a list of URL addresses, to generate n QR codes, each encoding the x=n URL addresses generated and verified as univocal, to assign a generated and univocal URL address to a specific accredited service user in a form that can be loaded and modified dynamically, to configure the generated and assigned URL address in order to display the informative contents, to optically acquire the QR code and to decode the encoded URL address, directing the user to the informative contents of the URL address.

20 Claims, 6 Drawing Sheets

(51) Int. Cl.
*G06K 9/80* (2006.01)
*G06K 19/06* (2006.01)
*G06F 17/30* (2006.01)
*G06K 7/14* (2006.01)

(58) Field of Classification Search
USPC ...... 235/462.1, 462.09, 462.01, 462.07, 375, 235/487
See application file for complete search history.

(56) References Cited

OTHER PUBLICATIONS

"URL Generator—Create a list of URL's based on the field values you enter," pp. 1-4, Jun. 20, 2003.
Search Report and Written Opinion for PCT/IB2014/064073, mailed Oct. 22, 2014.
International Preliminary Report on Patentability for PCT/IB2014/064073, mailed Nov. 3, 2015.

\* cited by examiner fig. 1 fig. 3 fig. 2 fig. 4

EDITING (Valid for entertainment use)
(Users)

fig. 5

EDITING (Valid for information use and Sensitive data)
(Editors)

fig. 6

READING QR CODES (Valid for information use)
(Guest)

fig. 7

READING/EDITING QR CODES (Valid for Sensitive data)
(Operators/users)

fig. 8 fig. 9

METHOD AND APPARATUS FOR THE REMOTE SUPPLY, DISPLAY AND/OR PRESENTATION OF DYNAMIC INFORMATIVE CONTENTS

FIELD OF THE INVENTION

The present invention relates to a method and apparatus for the remote supply, display and/or presentation of dynamic informative contents by generating a QR code with a dynamic content. In particular, the present invention relates to the field of processing data and receiving dynamic, text or multimedia information, through a computer or telecommunication network, by scanning a QR code shown in a real environment.

BACKGROUND OF THE INVENTION

One-dimensional (1-D) and two-dimensional (2-D) bar codes are known, which are formed by a specific set of symbols. In particular, two-dimensional codes provide the capacity of storing large quantities of information compared with one-dimensional bar codes. Among 2-D bar codes QR codes are very common on the market, also because of the massive diffusion of portable smartphones or suchlike, such as tablets and phablets.

QR codes are typically used, as well as for tracing objects, also for providing complex multimedia contents by suitable applications for users. QR codes can be used to show a text to a user, to add contact information to a user's telephone, to open a webpage or compose a text message or an email. A user can also generate and print autonomously his/her own QR code encoding determinate information and can post it at various real environments and also virtually on webpages. Often, QR codes are used to store network or telecommunication addresses, such as for example in links to a particular URL resource on the Internet, or other network addresses.

Furthermore, QR codes can appear on magazines, newspapers, road signs, public transport, business cards and in general any object, real or virtual, that can appear to a person in the real world.

Users who have smartphones with a camera and a suitable software for reading QR codes can scan, that is, acquire optically, the image of a QR code and receive the information encoded therein. This data connection to physical objects is commonly called "hardlink" or "real world hyperlink".

Document US-A-2011/283196 describes a web-based electronic RSVP service that allows the final user organizing an event to manage a list of guests for the event, to manage and organize the guests' RSVP replies, that is, whether or not they will be present at the event, to communicate with the guests before the event and communicate with the guests after the event. This RSVP service allows the guests to reply electronically to the RSVP requests by accessing a specific network address like a URL in a web browser. The service allows the guests to download and transmit information and other contents concerning the event, for example photos and videos, before, during or after the event. The service provides a personalization engine to allow the organizing final user to select a particular model of invitation card and to personalize it by adding personalization data such as photos, messages, colors. The service can be chosen by the organizing final user as part of a process for ordering invitations. In this case, guests can connect to the service using a web browser in order to send their replies. The replies and other data referring to the event can be accessible for the organizing final user and also for the guests. The service provides a webpage generation module to generate dynamically a series of RSVP webpages, defined as the RSVP website, in reply to the selection by the organizing final user of an RSVP option. The URL address connected to the RSVP website is generated dynamically and printed on the invitation cards sent to the guests and, in addition, can be transmitted directly by email to the guests. The URL address can be printed with alphanumerical characters on the back of the invitation card together with a QR code or other bar code format that can be scanned to connect to the RSVP website. Irrespective of how the guests connect to the RSVP website, that is, to the corresponding webpages, the guests themselves can access and modify various types of data of the event, for example information on the event, such as date, time and place, or can transmit photos and videos of the event, for example during or after the event, and send comments or other messages about the event. The organizing final user can also have the possibility of accessing data of the event and of modifying them. In particular, the organizing final user can select the RSVP service option and a URL is automatically generated for the RSVP website, or it is created manually by the organizing final user, for example by specifying a single URL that includes alphanumerical characters concerning the event. The invitation is displayed by the system for the organizing final user with the URL and/or QR code, with the possibility of modifying them or of removing the URL and/or the QR code. The guest can use the URL received or the QR code to connect to the RSVP website and give his/her reply. The users of the RSVP service can transmit photos, videos, comments and other data to the RSVP website before, during and after the event, transforming the RSVP website into a social network site for the specific event.

Consequently, limits and defects of this known RSVP service derive from a potential lack of confidentiality of the data and the possibility that they can be modified or integrated by guests with other information, text, messages, photos, videos, without any control by the organizing final user, in a most unwanted manner. In fact, one possible disadvantage of the RSVP service is that all the guests, and not only the organizing final user, can transmit informative content, text, messages, photos, videos or other multimedia contents to the RSVP website. Another disadvantage is the risk that identical URLs may be generated, and therefore the confidentiality of the data may be compromised if different users can access the same URL.

There is therefore a need to perfect a method and an apparatus to remotely display dynamic informative contents that can overcome at least one of the disadvantages of the state of the art.

Purpose of the present invention is to obtain a method and an apparatus to remotely display dynamic informative contents, in particular to present dynamic contents in reply to successive scannings of a QR code, which remains unchanged or static, and to cause said dynamic contents to be associated securely and univocally to a registered and authenticated user, that is, accredited to use at least the service of modifying contents.

The Applicant has devised, tested and embodied the present invention to obtain these and other purposes and advantages.

Unless otherwise defined, all the technical and scientific terms used here and hereafter have the same meaning as commonly understood by a person with ordinary experience in the field of the art to which the present invention belongs.

SUMMARY OF THE INVENTION

The present invention is set forth and characterized in the independent claims, while the dependent claims describe other features of the invention or variants to the main inventive idea.

In accordance with the above purpose, a method is provided for the remote display of dynamic informative contents by generating a QR code with a dynamic content, performed by an apparatus provided with a computer server system accessible from a communication network and in communication with a wireless communication network, such as a cell phone communication network. The computer server system can include an electronic memory to store a plurality of URL addresses in a format readable by a computer.

The method provides to generate at least one static QR code that encodes pointing information to a URL address on the Internet.

It is provided that each URL address is associated to one or more informative, text or multimedia contents, for example audio, photos, videos, which can be changed, modified, updated by a supplier of services or a system administrator who manages said computer server system or exclusively by a user who supplies said one or more informative contents.

In particular, embodiments described herein relate to a method for the remote supply, display or presentation of dynamic informative contents by generating a QR code with a dynamic content, which provides:

- to define a quantity n of a series of QR codes to be generated;
- to generate x URL addresses on the Internet, until x=n;
- to verify the univocity of each of the x URL addresses generated, by comparing them with URL addresses stored in a list of URL addresses;
- to generate n QR codes, each encoding the x=n URL addresses generated and verified as univocal;
- to assign a specific generated and univocal URL address to a single specific accredited user supplying one or more informative, text or multimedia contents;
- to make available informative, text or multimedia contents, in a form that can be loaded and modified dynamically exclusively by the accredited user supplying said one or more informative contents or by the system administrator;
- to configure the generated and assigned URL address in order to allow one or more receiving users to access or display the informative contents and the informative contents modified on each occasion exclusively by the supplier user or the system administrator;
- to optically acquire the QR code and to decode the encoded URL address, by said one or more receiving users, directing them to the informative contents of the URL address assigned and accessing or displaying said informative contents and the dynamic informative contents, that is, those modified on each occasion exclusively by the supplier user or by the system administrator.

The present invention therefore has important advantages connected to a great confidentiality of the data and informative contents of the URL address assigned and to the fact that it is not provided that, apart from the supplier user or the system administrator, the data and informative contents of the specific URL address assigned are modified or integrated by the receiving users by other information, text, messages, photos, videos. In fact, in the present invention, only the supplier user or the system administrator can make available or modify the data and informative contents of the URL address assigned, whereas the receiving users can only access or display or in general receive and use said data and informative contents. Moreover, with the URL univocity control according to the present invention, identical URLs are not generated, avoiding any compromise of the confidentiality of the data.

These and other aspects, features and advantages of the present disclosure will become better understood with reference to the following description, drawings and attached claims. The drawings, which are incorporated in and constitute a part of this specification, illustrate embodiments of the present subject matter, and together with the description, serve to explain the principles of the disclosure.

The various aspects and features described in the present disclosure can be applied individually, wherever possible. These individual aspects, for example the aspects and features described in the attached dependent claims, can be made subject of divisional applications.

It should be noted that any aspect or feature found already known during the patenting process is understood not be claimed and to be the subject of a disclaimer.

BRIEF DESCRIPTION OF THE DRAWINGS

These and other features of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and features of one embodiment can conveniently be incorporated into other embodiments without further clarifications.

DETAILED DESCRIPTION OF THE EMBODIMENTS

Reference will now be made in detail to the various embodiments of the invention, one or more examples of which are illustrated in the figures. Within the following description of the drawings, the same reference numbers refer to the same components. Generally, only the differences with respect to individual embodiments are described. Each example is provided by way of explanation of the invention and is not meant as a limitation of the invention. For example, features illustrated or described as part of one embodiment can be used on or in conjunction with other embodiments to yield yet a further embodiment. It is intended that the present invention includes such modifications and variations. Embodiments according to the present invention essentially provide to generate and assign to a QR code a URL address on Internet, the informative content of which is dynamic and storable in a database, hence modifiable/editable as desired by a content management system (CMS) exclusively by users supplying said informative content or system administrators, and not by users receiving the QR code and addresses of said informative content, which they can only use without being able to modify or integrate. In some embodiments, the receiving user, in particular, performs a passive role, except for reading the QR code and accessing the corresponding URL, in the remote supply, display and/or presentation of dynamic informative contents according to the present invention, since he/she represents only an objective or target of the informative content, without being able to change or modify it.

The application of the present invention diffusely and on a wide scale will allow, for example, to eliminate paper backups with a consequent reduction of costs and with advantages of environmental sustainability, rapid access to bureaucratic or technical data normally accessible only by complex technical operations, thus avoiding the risk of losing information and archive materials. Furthermore, the present invention can be widely exploited in the field of entertainment to supply, display or present dynamic informative contents, text, photos, audio, videos or multimedia in general, associated for example to a determinate object, real or virtual, also including web contents, carrying a QR code generated according to the present invention.

The present invention provides in particular to generate a URL address and possibly one or more univocal security codes.

In some embodiments, in particular, it may be provided to generate at least one univocal security code for each QR code that is presented unencrypted to the receiving user together with, or supplied separately from, the QR code and which is requested from the receiving user in order to access or display the informative contents of the URL address.

Furthermore, the present invention may provide a control of the univocity of the URL address generated and generation of a QR code that encodes the URL address.

Furthermore, it may be provided to activate the QR code, to register the supplier user with the service and to authenticate access to the service by the registered supplier user.

Furthermore, it may be provided to manage the informative, text or multimedia contents, exclusively by the supplier user or the system administrator, by said content management system (CMS).

The present invention can be applied for example to the entertainment/amusements field, or information field or again for processing sensitive data, as will be described hereinafter by way of example.

In some embodiments a user supplying one or more informative, text or multimedia contents can register with a service for the remote supply, display or presentation of dynamic informative contents by generating a QR code with dynamic contents according to the present description. The method may provide to assign a specific URL address, generated and univocal, having encoded a respective QR code, to said user supplying one or more informative, text or multimedia contents, who is a single and specific supplier user for said URL address. The supplier user loads said one or more informative, text or multimedia contents so that they are accessible from the URL address. The supplier user supplies the QR code that encodes the URL address to a receiving user. The QR code can be stamped or printed on a real or virtual object, for example based on web content, which the supplier user provides to the receiving user. The receiving user reads the QR code and is then connected by a web browser to the URL address, which is associated to said informative contents. The receiving user can display, receive or use the informative contents but cannot change or integrate them.

Examples of Applications of the Present Invention

Entertainment

The present invention can be applied to personalize articles, products, objects, real or virtual, for example web content, provided with a QR code according to the present invention, which are used by a first user, or receiving user who temporarily or permanently possesses the article or product or object, real or virtual, and which can be personalized, updated, modified as desired, in their informative, text or multimedia contents, dynamically associated with the URL address of the QR code, exclusively by a second user registered with and subscribing to the service, who temporarily or permanently provides the given article or product or object, real or virtual, to the first user, that is, modifiable exclusively by a supplier user or a system administrator. For example it may be provided to affix the QR code according to the present description, for example by printing or appliqué on articles of clothing or garments, such as sweaters, T-shirts, polo shirts, sweatshirts, shirts, trousers, skirts, clothing accessories such as bags, belts, shoes, hats, glasses, or furnishing elements or accessories, gift articles or stationery, toys, books and magazines, postcards, stamps or other, with the possibility of geo-referencing the QR code.

Sensitive Data

The present invention can be used by affixing the QR code according to the present invention by printing or appliqué on documents, products or articles, for example relating to:
  the health field, for example providing a health card with a QR code the content of which can be updated or modified depending on the evolution of the user's clinical or health history;
  the tax field, providing for example a card, badge or sheet provided with a QR code the content of which can be updated or modified depending on the evolution of a user's tax history;
  the registry office, providing for example an identity card provided with a QR code with the user's data, such as personal data, tax data, driving license, archive of residences, court records;
  the insurance field, by interaction with automobile companies, insurance companies and proprietors of automobiles and motor vehicles, for example by affixing one or more QR codes according to the invention on automobiles and motor vehicles, for example with the function of recording the insurance deadlines and the corresponding history, and also with the function of a "black box", to trace reliably all the events connected with the operating life of the means of transport (for example accidents, vehicle inspections, maintenance, tests, modifications);

school, with the possibility of providing a QR code according to the invention associated with each student on reports, University exam records, registration lists for exams;

the field of documentation and archives, to access quickly and reliably contents that would otherwise be difficult to access, for example in the land register.

Information Field

Business and Advertising possibility of personalizing business cards with QR code according to the present invention, and thus be able to update data dynamically over time;

possibility of using a QR code according to the invention for advertising announcements, for example in the housing market, of updating or modifying the multimedia text of the announcement, but without needing to change the QR code itself;

possibility of tracking and geo-localizing products by companies, with profiling of users and consumers;

possibility that a QR code is generated not for a plurality of specific companies but for categories of companies, providing an identification code to distinguish, inside the same category, the same QR codes of the different companies. For example, it is possible to provide a single QR code for forwarding agents, another for retailers, etc., and associated univocal identification codes.

Field of Infrastructures and Public or Private Transport possibility of providing a QR code according to the invention on tickets, receipts for public or private transport, by air, sea or land;

possibility of providing tickets having a QR code according to the invention for toll charges for access to transport routes;

possibility of providing tickets having a QR code according to the invention for charges for car park use;

possibility of providing a QR code according to the invention for road signs, with the possibility of supplying and updating service messages and public utility messages.

Field of Commerce field of maintenance of household appliances and domestic systems (water, light, gas), providing for example a ticket, card or badge provided with a QR code that carries the history of the maintenance, updatable or modifiable by the operator and displayable by the user;

possibility of affixing the QR code according to the present invention on cards or tickets for accessing public premises, such as for example discos, bars, restaurants, cinemas, sports facilities;

possibility of affixing the QR code according to the present invention on lottery tickets;

possibility of affixing the QR code according to the present invention on paper advertising material distributed by hand, such as fliers, brochures or suchlike, and of updating the associated informative content, without needing to continuously print new versions thereof.

Field of Cultural Heritage possibility of affixing the QR code according to the present invention on tickets for entrance to museums, art exhibitions or sites of cultural interest;

possibility of using the QR code according to the present invention permanently at museums, art exhibitions or sites of cultural interest, for the purposes of dissemination and information, updating the text or multimedia content thereof, depending on the aspect of cultural interest to be emphasized on each occasion, with the possibility of geo-referencing the QR code itself.

Tourism road signs for tourists provided with QR codes according to the invention with information on the place visited;

possibility of associating one or more QR codes according to the invention to reception structures, such as hotels, hostels, mountain refuges, restaurants or agritourisms, to supply and update information concerning them, with the possibility of geo-referencing the QR code itself.

With reference to FIGS. 2-8 we shall now describe possible embodiments of the present invention.

Generation of Series of QR Codes and Univocal Security Codes

Figure 2:
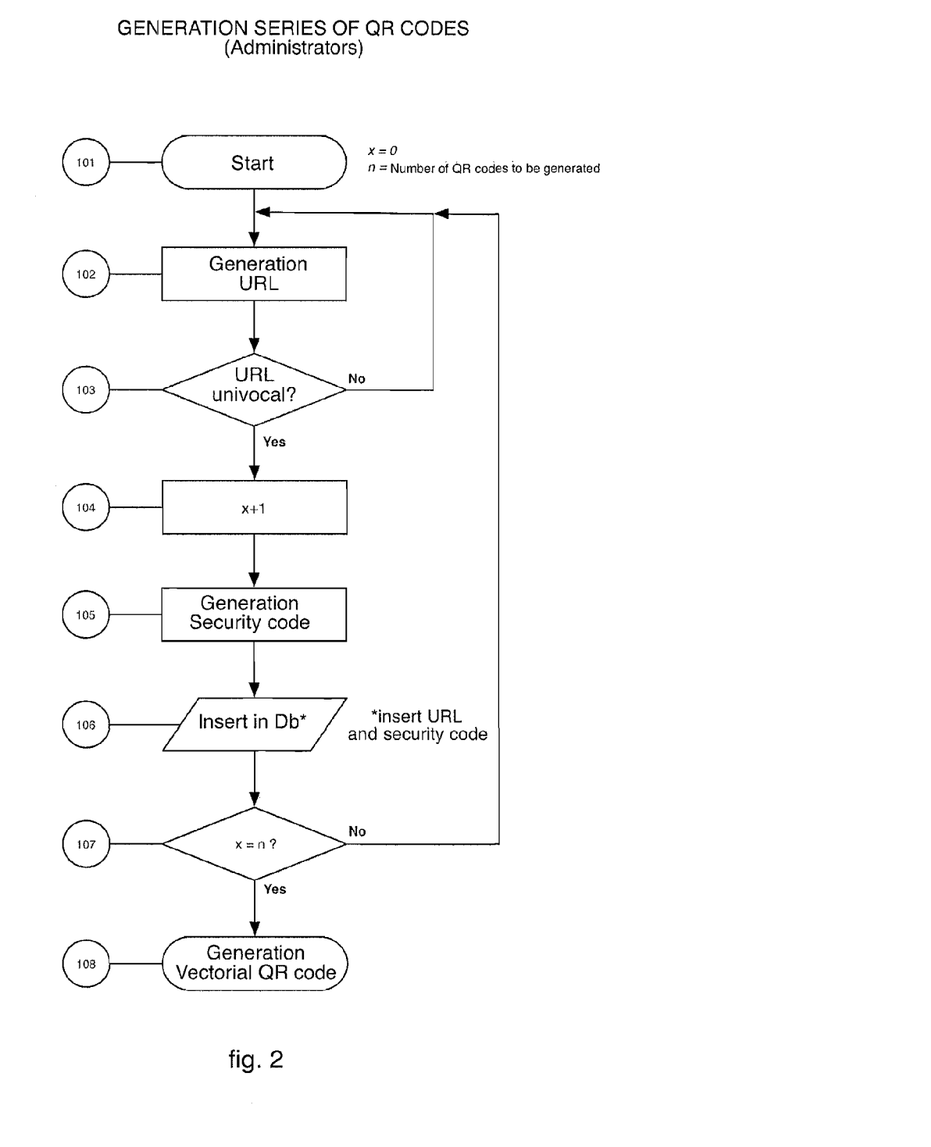
FIG. 2 is a block diagram of embodiments of part of the method according to the present description for generating series of QR codes by administrators.

We shall now describe embodiments to generate the URL address and the series of QR codes which can be used by system administrators, for example but not only for application in the field of entertainment/amusements or information, or again for processing sensitive data (see for example FIG. 2).

An online computer system is prepared for generating series of QR codes by administrator users who, for example by a graphical interface, can introduce the number "n" of QR codes to be generated (step 101 in FIG. 2).

The QR codes generated will be encoded with a URL address of the http://domain.ext/xyz type, where "domain" can be an Internet domain name registered, for example, by the system administrator, such as quzzup", "ext" is the extension of the domain, for example "it", "eu", "gov", "biz", "com", "org", and "xyz" is a string of m pseudorandom alphanumerical characters, for example 5<m<15, for example m=10, that can be generated by the following function (in which the variable length of the string is put for example at 10=), wherein "m" is the value of the length of the string that is passed to the function (step 102 in FIG. 2):

For example, the code generated will begin with a letter or a number, depending on the time given by the time( ) native function. The values will be compiled with a cycle that will be repeated "m" times, where "m" is the value passed to the function corresponding to the length of the string to be generated. The cycle calculates the rest of the division between a random number and the length m of the string and uses it as an indicator to find the character. Once the cycle is finished, a string is therefore obtained which is as long as the value "m" passed to the function.

For each URL address generated, a control is made on its univociy in the system, essentially based on a string matching (step 103 in FIG. 2).

The following portion of code can control that the URL address generated is actually univocal.

If this condition occurs, the data is stored in the database, possibly together with the possible security code. The possible security code can be supplied to the receiving user, who will have to use it to access the URL address encoded by the QR code or the corresponding informative contents.

If the URL address generated is really univocal, the system will provide first of all to increase the variable x, or counter variable x, (step 104 in FIG. 2) and subsequently to generate a code, for example 5 pseudorandom alphanumerical characters, called security code (step 105 in FIG. 2). The URL address and the security code generated will then be registered in a database (step 106 in FIG. 2).

Through the same function as in step 102, or through another function, the other alphanumerical code may be generated, which can serve for example as a control at the moment of assignment to a user of the QR code in question.

In possible embodiments, at the end of each cycle the variable x will be compared with the variable n in such a manner as to verify that the number of pairs of URL/security code corresponds to the value of the variable n valued at the moment the series is created (step 107 in FIG. 2).

Once the cycle of generating the URL addresses and possible coupled security codes is terminated, the data can be passed to a function that will generate for each individual URL/security code a QR code in a vectorial graphical format (step 108 in FIG. 2).

In particular, after the data relating to the URL address and the possible security code has been inserted in a database, the image thereof is generated in vectorial format and saved in a directory on the file system of the computer server system.

For this purpose, a system is prepared for generating series of physical QR codes in vectorial graphical format.

The decoded data of the QR codes correspond to the URL address previously generated.

The data assigned unencrypted can correspond to the possible security codes generated.

The generation of the QR code and the file, for example in PDF format, for printing, is performed for example by two Open Source libraries both distributed by GNU LESSER GENERAL PUBLIC LICENSE.

Figure 1:
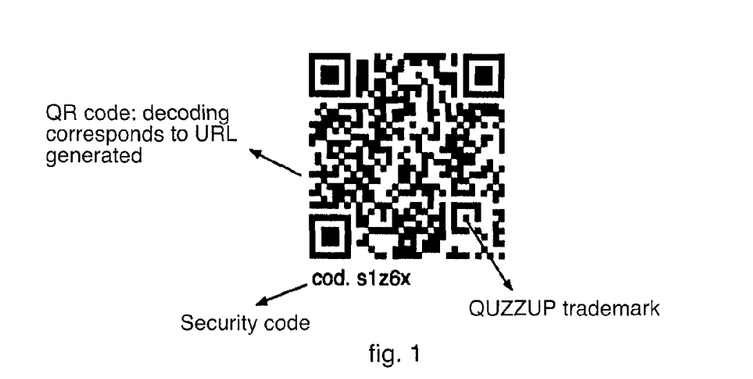
FIG. 1 is an example of a QR code obtainable with the method according to the present description.

The library that manages the generation of the image of the physical QR code—as shown for example in FIG. 1—can be for example the Open Source library PHP QR Code generator—Copyright © 2010 Dominik Dzienia, of which the following portion of code can be modified to generate a desired symbol or trademark, for example QUZZUP.

The library used to generate the corresponding PDF file can be for example TCPDF of Nicola Asuni—Tecnik.com.

Activation of the QR Code, Registration and Authentication

Figure 3:
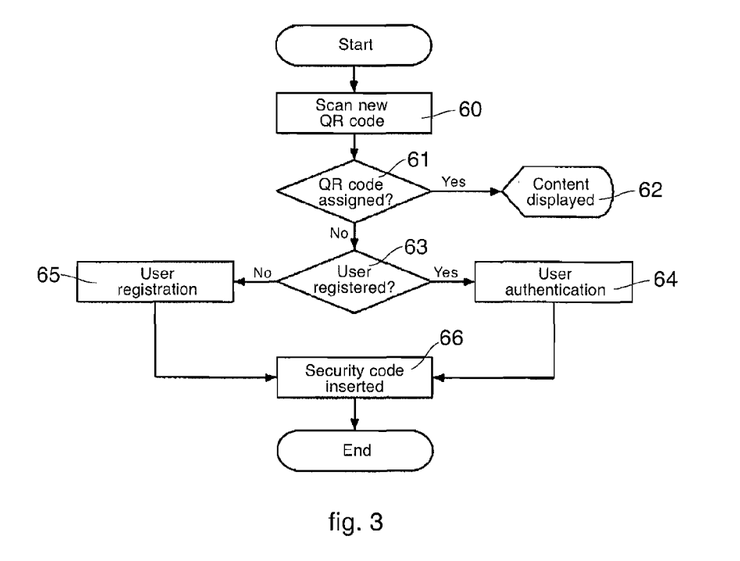
FIG. 3 is a block diagram of embodiments of part of the method according to the present description for acquiring and reading QR codes by users.

FIG. 3 is used to describe possible embodiments of a general procedure to activate, register and authenticate the QR code, usable according to the present description. According to the description, the QR code previously generated and the corresponding URL address and possible default security code are not associated to any user.

Using a smartphone for example, provided with a software for reading the QR code, or similar electronic device, for example mobile or portable, with telecommunication capacity and Internet connectivity, as well as acquisition and processing of images and QR code reading, it is possible to scan the QR code (step 60) and decode the URL address and perform addressing on the corresponding Internet browser. For example, other electronic devices usable can be a personal computer, remote terminals, tablets, phablets, notebooks, netbooks, ultrabooks or other. Once it has received the addressing request to the URL address, the computer server system verifies by a matching procedure that the same URL address visited has actually been generated and assigned by the computer server system as described by way of example above (step 61). If the QR code has already been assigned, the content of the associated URL address is displayed (step 62).

If the QR code has not yet been assigned, it is verified if the user is already registered (step 63) and if affirmative it proceeds to the authentication thereof (step 64) and the insertion of the possible security code (step 66). If the user is not registered, it proceeds with the registration (step 65) and subsequent step 66. After step 66, the activation, registration and authentication procedure is terminated.

If the URL address exists in the database of the computer server system, a procedure is activated to univocally assign said URL address to a user, which can provide for example to supply the possible security code associated to the QR code, for example inputting it in a data insertion mask, conditional to registration or authentication—if already registered—of the user to the website that supplies the service, for example domainname.ext.

Example of Assignment/Reading by Users

Figure 4:
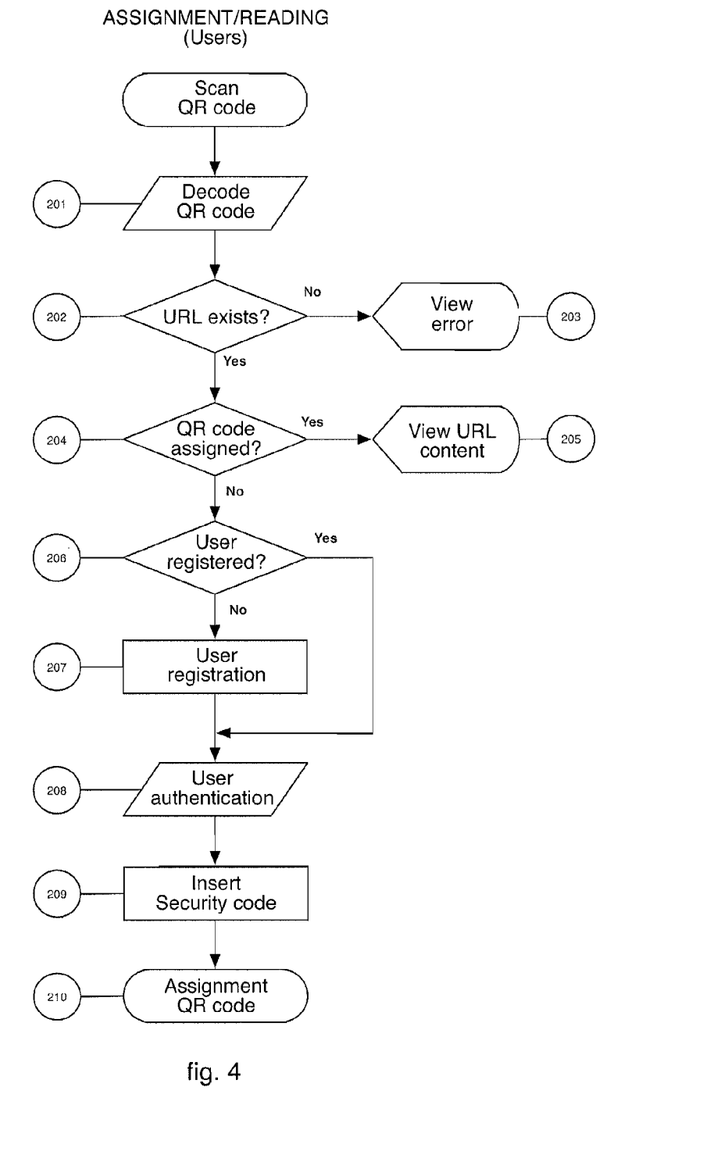
FIG. 4 is a block diagram of embodiments of a variant of a part of the method according to the present description for acquiring and reading QR codes by users, applied to entertainment.

We shall now describe embodiments, using FIG. 4, for the assignment and reading of QR codes by users, for example in the specific application to the field of entertainment.

An online system is prepared for decoding the URL address contained in the QR code scanned by any QR code reader (step 201).

The system will verify that the URL address contained in the QR code scanned actually exists in the database (step 202).

If the URL address does not exist, an error screen will be displayed (step 203), otherwise a control will be made on the assignment (step 204) of the ownership of the QR code to a receiving user. If the QR code has already been assigned to a receiving user, the multimedia content will be displayed corresponding to the URL address contained in the QR code (step 205), otherwise the QR code is recognized as not assigned and consequently the registration is verified (step 206), with a consequent possible user registration step (step 207) or, for a user already registered, the user authentication will be carried out (step 208) and the insertion of the corresponding security code (209) by the receiving user, so as to proceed with the assignment of the ownership of the QR code to the user (step 210).

Content Management System

A computer system is prepared to implement a content management system (CMS), which can be accessible only through authentication to the computer server system, only by the supplier user or the system administrator and not by the users receiving the QR code, for the addition, modification or deletion of informative, text or multimedia contents, in the webpage corresponding to the URL address referred to by the decoding of the QR code according to the present invention.

The modification or editing permissions to edit the informative contents associated to a URL address encoded by a given QR code are exclusively assigned to the supplier user assignee of the QR code in question, that is, to the supplier user, who in this way can modify the content of the webpage associated to the URL address at his discretion, for a finite or infinite number of times, while the user receiving the QR code cannot modify the informative contents of the webpage associated to this URL address.

The informative contents which can be modified exclusively by the supplier user or the system administrator, can be of a text or multimedia nature, in particular they can include for example:
i) addition/modification/deletion of text messages,
ii) addition/modification/deletion of images;
iii) addition/modification/deletion of videos;
iv) addition/modification/deletion of audios;
v) combination of the above i) to iv).

In possible embodiments, a software filter can be provided, possibly with self-learning capacity, on the nature of the informative contents that can be associated to the webpage, for example for the purposes of controlling privacy, to guarantee respect for morality or public order.

Example of Editing for Entertainment Use by Users

Figure 5:
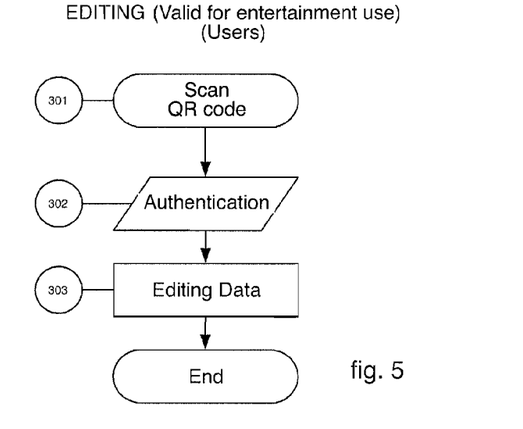
FIG. 5 is a block diagram of embodiments of a part of the method according to the present description for editing contents of QR codes by users, applied to entertainment.

We shall now describe some embodiments, using FIG. 5, for editing contents by users, in the specific application to the field of entertainment.

After having scanned the QR code using any QR code reader (step 301) the authentication of the user will be requested (step 302) which will give access to the supplier user to the Content Management System (CMS) through which it will be possible to add, modify and eliminate informative contents, text, multimedia data, present at the URL address, encoded in the QR code (step 303).

Figure 6:
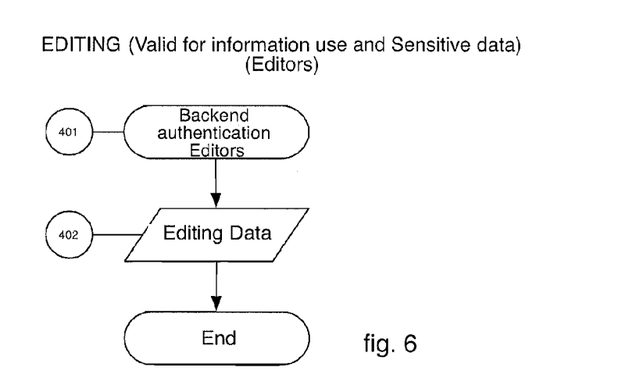
FIG. 6 is a block diagram of embodiments of a part of the method according to the present description for editing contents of QR codes by editors, applied to information use and processing of sensitive data.

Example of Editing for Information Use and Sensitive Data by Editors or Accredited Service Providers We shall now describe embodiments, using FIG. 6, for editing the contents by editors or accredited service suppliers, in the specific application for the information field or processing of sensitive data.

An online reserved area is prepared with access regulated by reserved credentials, such as log-in and password, through which to carry out an authentication step (step 401) and subsequently a modification and elimination step (step 402) of the multimedia data present at the URL address contained in the QR code through the Content Management System (CMS).

Example of QR Code Reading for Information Use by Guests of the Service

Figure 7:
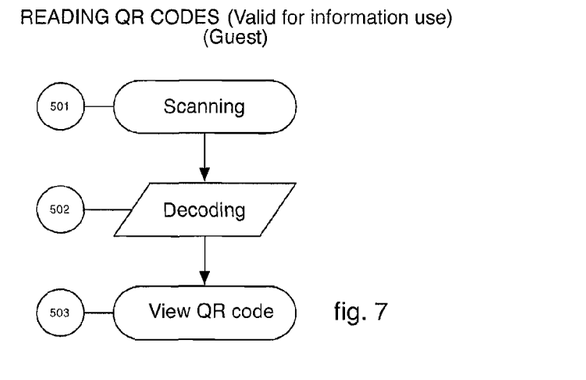
FIG. 7 is a block diagram of embodiments of a part of the method according to the present description for reading QR codes by a guest, applied to information use.

We shall now describe embodiments, using FIG. 7, for information use by guests of the service, for example in the case of services for tourism or commerce, or others described above by way of example.

After having scanned the QR code using any QR code reader (step 501), the system will decode the URL address contained in the QR code (step 502) and the multimedia content corresponding to the URL address referred to by the QR code scanned is restored in output (step 503).

Example of Reading/Editing for the Use of Sensitive Data by Users or Operators

Figure 8:
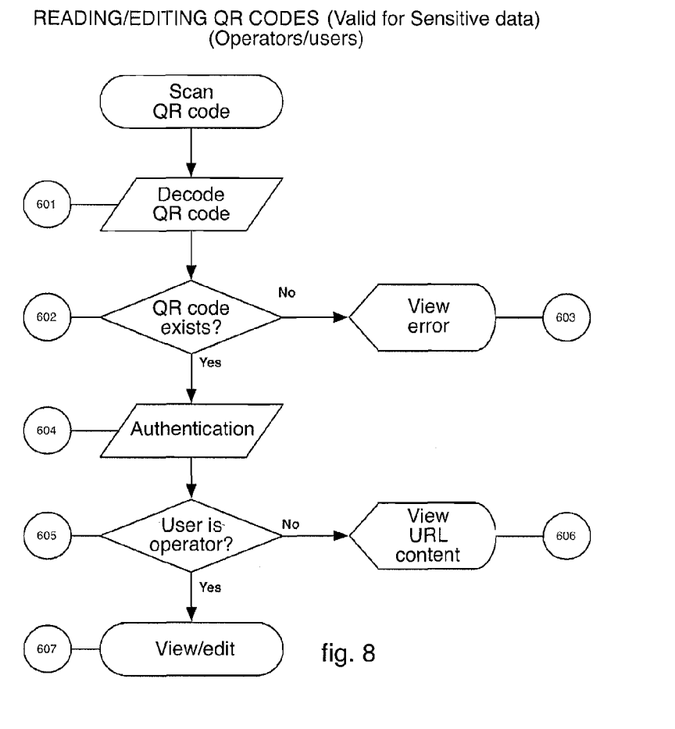
FIG. 8 is a block diagram of embodiments of a part of the method according to the present description for reading and/or editing contents of QR codes by users and operators, applied to the processing of sensitive data.

We shall now describe embodiments, using FIG. 8, for possible reading and editing contents of sensitive data by users or operators (for example in the health, tax or registry field or others described above by way of example).

An online system is prepared to decode the URL address contained in the QR code scanned by any QR code reader (step 601). The system verifies that the URL address contained in the QR code reader scanned does effectively exist in the database (step 602).

If the URL address does not exist, an error screen will be displayed (step 603). Instead, if the URL address contained in the QR code reader scanned really exists, once authentication has been carried out (step 604), verification is carried out to verify if the user who accesses the service is also an operator enabled to edit the contents (step 605). If the user is standard, only the multimedia content of the URL address can be displayed (step 606), whereas if the user is an operator, as well as displaying it, they can also edit the contents thereof (step 607), using a Content Management System (CMS).

Figure 9:
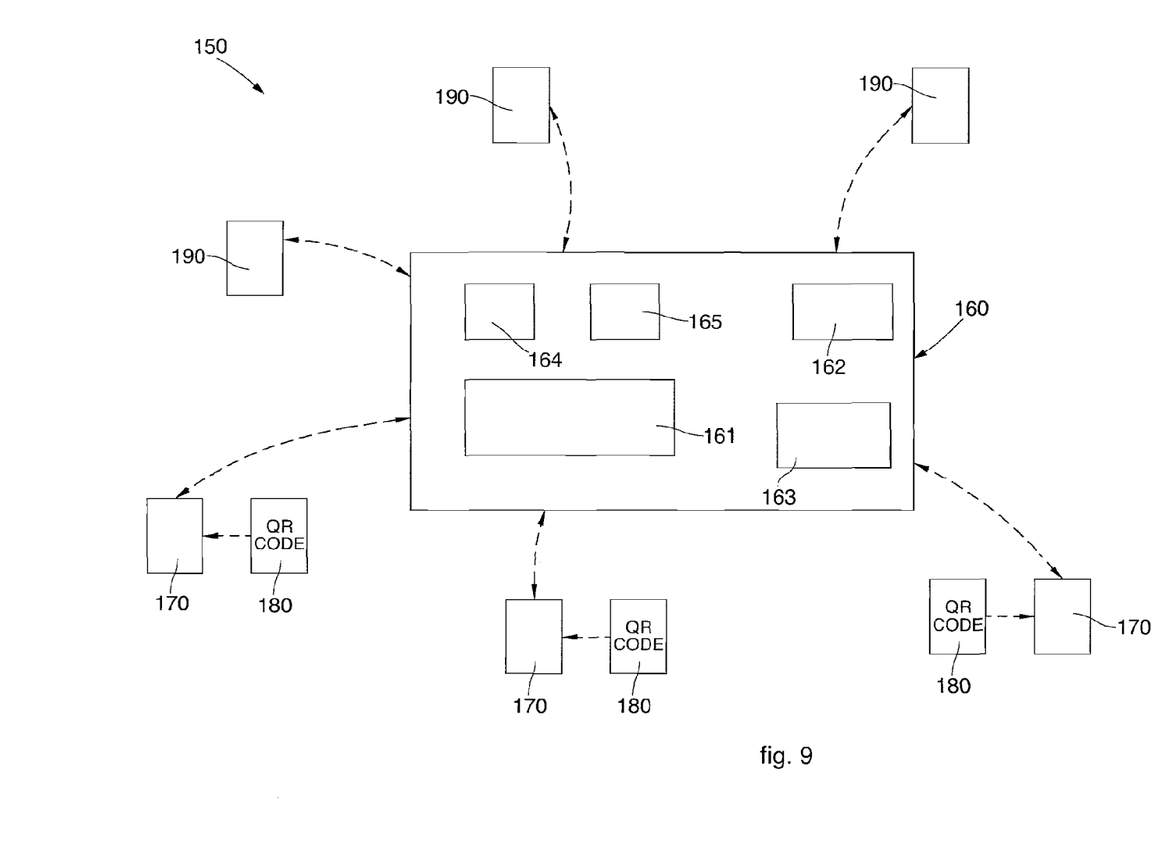
FIG. 9 is a block diagram of embodiments of an apparatus according to the present description.

Apparatus for the Remote Display of Dynamic Informative Contents by Generating a QR Code with Dynamic Content The method according to the present invention can be executed using an apparatus, or electronic communication architecture 150 described for example with reference to FIG. 9, for the remote supply, display or presentation of dynamic informative contents by generating a QR code with a dynamic content, which comprises:

a computer server system 160 configured to:
  define a quantity n of a series of QR codes to be generated;
  generate x URL addresses on the Internet, until x=n;
  verify the univocity of each of the x URL addresses generated by comparing them with URL addresses stored in a list of URL addresses;
  generate n QR codes, each encoding the x=n URL addresses generated and verified as univocal;
  assign a specific generated and univocal URL address to a single and specific accredited supplier user of one or more informative, text or multimedia contents;
  make available said informative, text or multimedia contents, in a form that can be loaded and modified dynamically exclusively by the accredited user supplying said informative contents or by one or more system administrators;
  configure the generated and assigned URL address in order to allow one or more receiving users to access or display the informative contents and the dynamic informative contents, that is, those modified on each occasion exclusively by the supplier user or by the system administrator;
one or more portable electronic telecommunication devices 170 configured to optically acquire the QR code and to decode the encoded URL address, by said one or more receiving users, directing the user to the informative contents of the assigned URL address made available by the computer server system 160 and accessing or displaying said informative contents and the informative contents modified on each occasion exclusively by the supplier user or by the system administrator;
one or more user interfaces 190 configured to access the computer server system 160 and to load and modify dynamically said informative contents, exclusively by the supplier user or by the system administrator.

The list of URL addresses can be stored and managed by a database. In some embodiments, the database can be implemented using MySQL. However, various different formats of databases can be used, for example Microsoft SQL, IBM SQL, etc.

In particular, the computer server system 160 can comprise a central processing unit 161 or CPU, an electronic memory 162, an electronic database 163 and auxiliary circuits (or I/O) (not shown).

For example, the CPU can be any form of processor for computers usable in the IT field for controlling computer security. The memory can be connected to the CPU and can be one or more of those available on the market, such as a random access memory (RAM), a read-only memory (ROM), floppy disc, hard disc, mass memory or any other form of digital archive, local or remote. The software instructions and the data can be encoded for example and stored in the memory to command the CPU. The auxiliary circuits can also be connected to the CPU to help the processor in a conventional manner. The auxiliary circuits can include for example at least one of: cache circuits, feed circuits, clock circuits, input/output circuits, subsystems and suchlike. A program (or computer instructions) readable by the computer server system 160 can determine which tasks are doable according to the method of the present description. In some embodiments the program is a software readable by the computer server system 160. The computer server system 160 includes a code to generate and store information and data introduced or generated in the course of the method according to the present description.

The computer server system 160 of the electronic communication architecture 150 may provide a web server that can be an Apache web server on a Linux platform with PHP programmed software using a MySQL database. Additionally, the platform can exploit various techniques to establish communication with the clients and other services. For example, the electronic communication architecture 150 can expose an application programming interface (API) to allow communication with clients or other services. The API can be based on a Representational State Transfer (REST) architecture to distribute hypermedia systems.

The electronic communication apparatus 150 also comprises, as we said, one or more electronic portable telecommunication devices 170 associated with the various users and configured for telecommunication and data network connectivity, and also to acquire and encode the QR codes, such as typically a smartphone. Furthermore, the electronic communication apparatus 150 can provide one or more QR codes produced according to the present description and applied or printed on articles or objects 180 accessible for users.

The electronic communication apparatus 150 also comprises, as we said, one or more user interfaces 190 to access one's account on the computer server system 160 from remote, such as personal computers, remote terminals, smartphones, tablets, phablets, notebooks, netbooks, ultrabooks or other, by which a user can register and/or authenticate himself with the service at the computer server system 160 and access the service, loading, modifying, updating or eliminating the informative, text or multimedia contents associated with the URL address encoded in the QR code, or to several URL addresses, associated to several QR codes that the user manages.

The central processing unit 161 can be configured and used to perform one or more steps of the method described herein.

The electronic memory 162 can be configured and used for example to store, temporarily or definitively, data useful for the execution of one or more steps of the method described herein, for example the informative contents loaded or modified on each occasion, and also the URL addresses generated.

The electronic database 163, which can be stored in the electronic memory 162 or can be stored on another memory support, can be configured and used to organize, manage and make available the data useful for executing one or more steps of the method described herein, for example to implement and organize the Content Management System (CMS), and also for allocating the URL addresses generated, managing the policies for controlling the univocity of the URL addresses generated, the univocal association thereof to QR codes and the univocal association of the QR codes to the users accredited with the service.

The computer server system 160 can also provide an input interface 164, or in any case an input device, for example connected in a network with other computers, or a telecommunication network. The input interface 164 can be configured and used to execute the insertion step 100.

The computer server system 160 can also provide one or more network connection devices 165, such as boards, modules or gates for network communication, wireless or cabled, with a network of other computers or a telecommunication network. These one or more network connection devices 165 can be used to access the computer server system 160 to execute from remote the method according to the present description.

Some embodiments can provide to execute various steps, passages and operations as described above. The steps, passages and operations can be made with instructions performed by a machine, which cause certain steps to be executed by a general-purpose or special-purpose processor. Alternatively, the steps, passages and operations can be executed by specific hardware components that contain hardware logic to execute the steps, or by any combination whatsoever of components for programmed computers and personalized hardware components.

Some embodiments of the method according to the present description can be included in a computer program storable in a mean readable by a computer that contains the instructions which, once executed by the apparatus 150, determine the execution of the method according to the invention.

In particular, elements according to the present invention can be supplied as means readable by a machine to store the instructions that can be executed by the machine. The machine-readable means can include, without being limited to, floppy disks, optical discs, CD-ROM, and magneto-optical discs, ROM, RAM, EPROM, EEPROM, optical or magnetic boards, propagation means or other types of machine-readable means suitable to store electronic information. For example, the present invention can be downloaded as a computer program which can be transferred from a remote computer (for example a server) to a computer making a request (for example client), by data signals achieved with carrier waves or other propagation means, via a communication connection (for example a modem or a network connection).

It is clear that modifications and/or additions of parts and/or steps may be made to the method and apparatus for remote display of dynamic informative contents as described heretofore, without departing from the field and scope of the present invention.

It is also clear that, although the present invention has been described with reference to some specific examples, a person of skill in the art shall certainly be able to achieve many other equivalent forms of method and apparatus for remote display of dynamic informative contents, having the features as set forth in the claims and hence all coming within the field of protection defined thereby.

The invention claimed is:

1. Method for the remote supply, display or presentation of dynamic informative contents by generating a QR code with a dynamic content, which provides:
    to define a quantity n of a series of QR codes to be generated;
    to generate x URL addresses on the Internet, until x=n, wherein the generation of the URL address provides to generate a string with a length of m pseudo-random alphanumerical characters, with a cycle repeated m times, which calculates the remainder of the division between a random number and the length m of the string and uses it as an indicator to find the alphanumerical character;
    to verify the univocity of each of the x URL addresses generated, by comparing them with URL addresses stored in a list of URL addresses;
    to generate n QR codes, each encoding the x=n URL addresses generated and verified as univocal;
    wherein, if a URL address is univocal, it is stored in a database which comprises said list of URL addresses, a counter variable x is increased until x=n and the number at least of security URL addresses corresponds to the value n of QR codes of the series to be generated;
    to assign a specific generated and univocal URL address to a single specific accredited user supplying one or more informative, text or multimedia contents;
    to make available informative, text or multimedia contents, in a form that can be loaded and modified dynamically exclusively by the accredited service user or by one or more system administrators;

to configure the generated and assigned URL address in order to allow one or more receiving users to access or display the informative contents and the informative contents modified on each occasion exclusively by the supplier user or the system administrator;

to optically acquire the QR code and to decode the encoded URL address, by said one or more receiving users, directing them to the informative contents of the URL address assigned and accessing or displaying said informative contents and the dynamic informative contents, that is, those modified on each occasion exclusively by the supplier user or by the system administrator;

wherein said method provides to generate at least one univocal security code for each QR code that is presented to the receiving user unencrypted together with, or supplied separately from, the QR code and which is requested from the receiving user in order to access or display the informative contents of the URL address, wherein said method provides to modify the contents associated to a URL address using a computer system to implement a content management system (CMS), accessible only through authentication to the computer server system, only by the supplier user or the system administrator and not by the users receiving the QR code, for the addition, modification or deletion of informative, text or multimedia contents, in the webpage corresponding to the URL address referred to by the decoding of the QR code, further wherein the modification permissions to edit the informative contents associated to a URL address encoded by a given QR code are exclusively assigned to the supplier user assignee of the QR code, or to the system administrator, to modify the content of the webpage associated to the URL address, while the user receiving the QR code cannot modify the informative contents of the webpage associated to said URL address.

2. Method as in claim 1, which provides registration to a loading and dynamic modification service exclusively by the supplier user and authentication for access to the service by the registered supplier user, with the simultaneous univocal assignment of a URL address.

3. Method as in claim 1, in which the first character of the string is a function of the time when the string was created.

4. Method as in claim 1, which provides to generate and store the QR code in a vectorial graphical format.

5. Method as in claim 1, which provides that the decoded data of the QR codes correspond to the previously generated URL address and the data assigned unencrypted correspond to security codes generated.

6. Method as in claim 1, which provides to dynamically modify the informative content associated to a specific URL address by a content management system (CMS) exclusively by a respective specific user supplying said informative content or a system administrator.

7. Method as in claim 1, which provides a general procedure of activating the QR code, registration and authentication wherein initially by default the previously generated QR code and the corresponding URL address and a possible security code are not associated to any user that, using an electronic device with a telecommunication capacity and Internet connection provided with software to read the QR code, provides to scan the QR code and decode the URL address and carry out an addressing on a corresponding internet web browser and the computer server system, once it has received the addressing request to the URL address verifies, using the "matching" procedure, that the same URL address visited has effectively been generated and assigned by the computer server system and, if the QR code has already been assigned, the content of the associated URL address is displayed, while if the QR code has not yet been assigned, it is verified if the user is already registered and if affirmative it proceeds to the authentication thereof and the insertion of the possible security code, while if the user is not registered, it proceeds with the registration and insertion of the possible security code, after which the activation, registration and authentication procedure is terminated.

8. Method as in claim 7, wherein if the URL address exists in the database of the computer server system, a procedure is activated to univocally assign said URL address to a receiving user, which can provide that the possible security code associated to the QR code is inserted by the receiving user.

9. Method as in claim 1, which provides the assignment and reading of QR codes by receiving users, wherein an online system is prepared to decode the URL address contained in the scanned QR code, that the system verifies that the URL address contained in the scanned QR code effectively exists in the database and that, if the URL address does not exist, it provides to display an error screen, otherwise it provides to control the assignment of the ownership of the QR code to a receiving user, if the QR code has already been assigned to a receiving user, it provides to supply or display the content corresponding to the URL address contained in the QR code, otherwise the QR code is recognized as not assigned and consequently the registration is verified, with a consequent possible user registration step or, for a user already registered, the user authentication is carried out and the insertion of the possible corresponding security code by the receiving user, so as to proceed with the assignment of the ownership of the QR code to the user.

10. Method as in claim 1, wherein the informative contents which can be modified exclusively by the supplier user or the system administrator are of a text or multimedia nature, in particular providing one or more of the following operations:
   i) addition/modification/deletion of text messages,
   ii) addition/modification/deletion of images;
   iii) addition/modification/deletion of videos;
   iv) addition/modification/deletion of audios;
   v) combination of the above i) to iv).

11. Method as in claim 1, which provides to use a software filter, possibly with self-learning capacity, on the nature of the informative contents that can be associated to the webpage.

12. Method as in claim 1, which provides to edit the contents by supplier users, wherein, after having scanned the QR code using a QR code reader the authentication of the user is requested which gives access to the supplier user to the Content Management System (CMS) through which to add, modify and eliminate informative contents, text, multimedia data, present at the URL address, encoded in the QR code.

13. Method as in claim 1, which provides to edit the contents by editors or accredited service suppliers or system administrators, wherein a reserved area is prepared online with access regulated by reserved credentials, through which to carry out an authentication step and subsequently a modification and elimination step of the multimedia data present at the URL address contained in the QR code through the Content Management System (CMS).

14. Method as in claim 1, wherein after having scanned the QR code using a QR code reader, it is provided to decode the URL address contained in the QR code and the multimedia content corresponding to the URL address referred to by the QR code scanned is restored in output.

15. Method as in claim 1, which provides a reading and editing of contents of sensitive data by supplier users or accredited operators or system administrators, wherein an online system is prepared to decode the URL address contained in the QR code scanned by a QR code reader, it verifies that the URL address contained in the QR code reader scanned does effectively exist in the database and, if the URL address does not exist, it provides to display an error screen, while if the URL address contained in the QR code reader scanned really exists, once authentication has been carried out, it provides a verification if the user who accesses the service is also an operator enabled to edit the contents, wherein the user is standard, only the multimedia content of the URL address can be displayed, whereas if the user is an accredited operator or system administrator, as well as displaying it, they can also edit the contents thereof, using a Content Management System (CMS).

16. Method as in claim 1, said method providing to generate and assign to a QR code a URL address on Internet, the informative content of which is dynamic and storable in a database, modifiable/editable as desired by said content management system (CMS) exclusively by users supplying said informative content or system administrators, and not by receiving users receiving the QR code and addresses of said informative content, said receiving users only being allowed to use the QR code and addresses of said informative content without being able to modify or integrate, said receiving user performing a passive role, except for reading the QR code and accessing the corresponding URL, in said remote supply, display and/or presentation of dynamic informative contents, said receiving user representing only an objective or target of the informative content, without being able to change or modify it.

17. Article or product, real or virtual, comprising a QR code generated using a method as in claim 1.

18. Apparatus for the remote supply, display or presentation of dynamic informative contents by generating a QR code with a dynamic content comprising:
  i) a computer server system configured:
    to define a quantity n of a series of QR codes to be generated;
    to generate x URL addresses on the Internet, until x=n, wherein the generation of the URL address provides to generate a string with a length of m pseudo-random alphanumerical characters, with a cycle repeated m times, which calculates the remainder of the division between a random number and the length m of the string and uses it as an indicator to find the alphanumerical character;
    to verify the univocity of each of the x URL addresses generated by comparing them with URL addresses stored in a list of URL addresses;
    to generate n QR codes, each encoding the x=n URL addresses generated and verified as univocal;
    wherein, if a URL address is univocal, it is stored in a database which comprises said list of URL addresses, a counter variable x is increased until x=n and the number at least of security URL addresses corresponds to the value n of QR codes of the series to be generated;
    to assign a specific generated and univocal URL address to a single and specific accredited supplier user of one or more informative, text or multimedia contents;
    to make available said informative, text or multimedia contents, in a form that can be loaded and modified dynamically exclusively by the specific accredited supplier user or by one or more system administrators;
    to configure the generated and assigned URL address in order to allow one or more receiving users to access or display the informative contents and the dynamic informative contents, that is, those modified on each occasion exclusively by the supplier user or by the system administrator;
  wherein said computer server system is configured to generate at least one univocal security code for each QR code that is presented to the receiving user unencrypted together with, or supplied separately from, the QR code and which is requested from the receiving user in order to access or display the informative contents of the URL address
  wherein the apparatus comprises a computer system to implement a content management system (CMS), accessible only through authentication to the computer server system, only by the supplier user or the system administrator and not by the users receiving the QR code, said content management system (CMS) being configured to modify the contents associated to a URL address, for the addition, modification or deletion of informative, text or multimedia contents, in the webpage corresponding to the URL address referred to by the decoding of the QR code,
  further wherein the modification permissions to edit the informative contents associated to a URL address encoded by a given QR code are exclusively assigned to the supplier user assignee of the QR code, or to the system administrator, to modify the content of the webpage associated to the URL address, while the user receiving the QR code cannot modify the informative contents of the webpage associated to said URL address
  ii) one or more portable electronic telecommunication devices configured to optically acquire the QR code and to decode the encoded URL address, by said one or more receiving users, directing the user to the informative contents of the assigned URL address made available by the computer server system and accessing or displaying said informative contents and the dynamic informative contents, that is, those modified on each occasion exclusively by the supplier user or by the system administrator;
  iii) one or more user interfaces configured to access the computer server system and to load and modify dynamically said informative contents, exclusively by the supplier user or by the system administrator.

19. The apparatus of claim 18, wherein the assignment and reading of QR codes includes receiving users, wherein an online system is prepared to decode the URL address contained in the scanned QR code, that the system verifies that the URL address contained in the scanned QR code effectively exists in the database and that, if the URL address does not exist, it provides to display an error screen, otherwise it provides to control the assignment of the ownership of the QR code to a receiving user, if the QR code has already been assigned to a receiving user, it provides to supply or display the content corresponding to the URL address contained in the QR code, otherwise the QR code is recognized as not assigned and consequently the registration is verified, with a consequent possible user registration step or, for a user already registered, the user authentication is carried out and the insertion of the possible corresponding security code by the receiving user, so as to proceed with the assignment of the ownership of the QR code to the user.

20. The apparatus of claim 18, wherein registration to a loading and dynamic modification service is exclusive to the supplier user and authentication for access to the service is exclusive to the registered supplier user, with the simultaneous univocal assignment of a URL address.

* * * * *